(12) United States Patent
Banks et al.

(10) Patent No.: US 7,191,535 B2
(45) Date of Patent: Mar. 20, 2007

(54) ON-MACHINE AUTOMATIC INSPECTION OF WORKPIECE FEATURES USING A LATHE ROTARY TABLE

(75) Inventors: Anton Banks, Manchester, CT (US); Joseph D. Drescher, Middletown, CT (US); Christian Jesse, Cromwell, CT (US)

(73) Assignee: United Technologies Corporation, Hartford, CT (US)

( * ) Notice: Subject to any disclaimer, the term of this patent is extended or adjusted under 35 U.S.C. 154(b) by 38 days.

(21) Appl. No.: 11/068,248

(22) Filed: Feb. 28, 2005

(65) Prior Publication Data
US 2006/0191149 A1 Aug. 31, 2006

(51) Int. Cl.
*G01B 5/004* (2006.01)
*G01B 21/04* (2006.01)

(52) U.S. Cl. ........................... 33/502; 33/549

(58) Field of Classification Search ............ 33/502, 33/503, 504, 505, 549, 550; 73/1.75, 1.79, 73/1.81; 702/150, 151, 167, 168
See application file for complete search history.

(56) References Cited

U.S. PATENT DOCUMENTS

| | | | | | |
|---|---|---|---|---|---|
| 3,795,054 | A | * | 3/1974 | Kinney | 33/505 |
| 4,636,960 | A | * | 1/1987 | McMurtry | 700/193 |
| 4,736,325 | A | * | 4/1988 | Nagae et al. | 700/160 |
| 4,819,339 | A | * | 4/1989 | Kunzmann et al. | 33/503 |
| 5,257,460 | A | * | 11/1993 | McMurtry | 33/502 |
| 5,373,222 | A | * | 12/1994 | Hemmerle et al. | 318/652 |
| 5,572,798 | A | * | 11/1996 | Barnaby | 33/549 |
| 6,092,411 | A | * | 7/2000 | Tokoi | 73/1.79 |
| 6,633,829 | B2 | * | 10/2003 | James | 702/151 |
| 6,711,829 | B2 | * | 3/2004 | Sano et al. | 33/549 |
| 2005/0033551 | A1 | * | 2/2005 | Takai et al. | 702/168 |
| 2005/0223579 | A1 | * | 10/2005 | Otsubo | 33/502 |
| 2006/0095227 | A1 | * | 5/2006 | Yamamoto | 702/150 |

FOREIGN PATENT DOCUMENTS

JP 62042010 A * 2/1987
JP 01202611 A * 8/1989

* cited by examiner

*Primary Examiner*—R. Alexander Smith
(74) *Attorney, Agent, or Firm*—Marjama & Bilinski LLP

(57) ABSTRACT

To enable the on-machine measurement of selected features of a workpiece formed on a live spindle lathe with a positioning rotary table, both the machine itself and the electronic touch probe used to conduct the measurements are calibrated. The accuracy of the machine itself is measured and calculated by including the measured errors not only in the x and z linear axes, but also in the y linear axis. Calibration of the touch probe is made by determining a correction factor which is obtained by the touch probe measurement of an artifact whose dimensions are precisely known by other means. This correction factor is then made to the nominal measurements made by the touch probe on the selected features of the workpiece to be measured, to obtain the actual dimensions thereof. Adjustments are also made to compensate for the differences in radial positions between the workpiece and the artifact.

9 Claims, 2 Drawing Sheets

ON-MACHINE AUTOMATIC INSPECTION OF WORKPIECE FEATURES USING A LATHE ROTARY TABLE

BACKGROUND OF THE INVENTION

The invention relates generally to a live spindle lathe in combination with a rotary table for positioning a workpiece for machining purposes and, more particularly, to a method and apparatus for calibrating such an apparatus for on-machine measuring of workpiece features produced on the apparatus. On-machine inspection is used in production to eliminate the time and expense of an additional operation to inspect a machined component (workpiece). It allows the workpiece to be easily re-machined when required and in fact, measurement and machining iterations can be designed into the production process with little added expense and greatly improved quality results. While usually workpieces are measured manually on the machine tool or removed to a separate measurement machine for inspection purposes, business conditions or large workpiece size may dictate automatic on-machine inspection using a measurement apparatus.

Automation of on-machine inspection is a good solution for large workpieces and it can eliminate the human error factor for even small workpieces. This means the machine itself is used as a measurement tool. The cutter is replaced with an electronic device called a touch probe. The touch probe is capable of sending a signal to the machine controller when it touches a surface. The controller then records the position of the probe. When two surface locations are recorded by this means, the difference in probe positions recorded constitutes a dimension measurement.

On-machine, automatic inspection has been used for years on lathes and machining centers. Lathes have two linear axes (i.e. the z and the x axes) and a workholding spindle. The spindle holds and turns the workpiece while the two linear axes move and position the cutting tool in a two dimensional plane. Therefore, normal lathes are limited to producing rotationally symmetric features. When the cutting tool is replaced with the touch probe, the movement is also confined to a two dimensional plane. Therefore, the lathe is usually limited to measuring diameters, wall thicknesses, flange thicknesses, and lengths of workpieces. Machining centers usually at least have three linear axes (X, Y, and Z). They can be used to make and measure 3-dimensional, non-rotationally symmetric features.

Recently, lathes have been designed with "live spindles" to hold and rotate a cutting tool such a drill or endmill while positioning a rotary table to angularly position the workpiece. These lathes can perform tasks that traditionally required a machining center in addition to the normal lathe function when the live spindle is replaced with a stationary cutting tool and the rotary table spins the component. Therefore, they allow certain operations to be combined on a single machine for added production efficiency. The automatic inspection of the three dimensional, non rotationally symmetric features on a lathe is a new challenge and requirement that has arisen as a result of this new type of machine.

SUMMARY OF THE INVENTION

Briefly, in accordance with one aspect of the invention, the inherent inaccuracies of a touch probe are determined by using the touch probe to measure known actual dimensions of certain features of an artifact. The inherent inaccuracies are determined by the difference between the measured results and the known actual dimensions of the artifact, which, then, are applied toward negating their effect on workpiece measurements.

By another aspect of the invention, the rotary measurements taken using C-axis are mathematically converted into linear measurements along the virtual Y-axis of the machine. These determined values of inaccuracies, then, are compared to a pre-determined tolerance to ensure the machine is within the allowed limits.

In the drawings as hereinafter described, a preferred embodiment is depicted; however, various other modifications and alternate constructions can be made thereto without departing from the true spirit and scope of the invention.

DESCRIPTION OF THE PREFERRED EMBODIMENT

Figure 1:
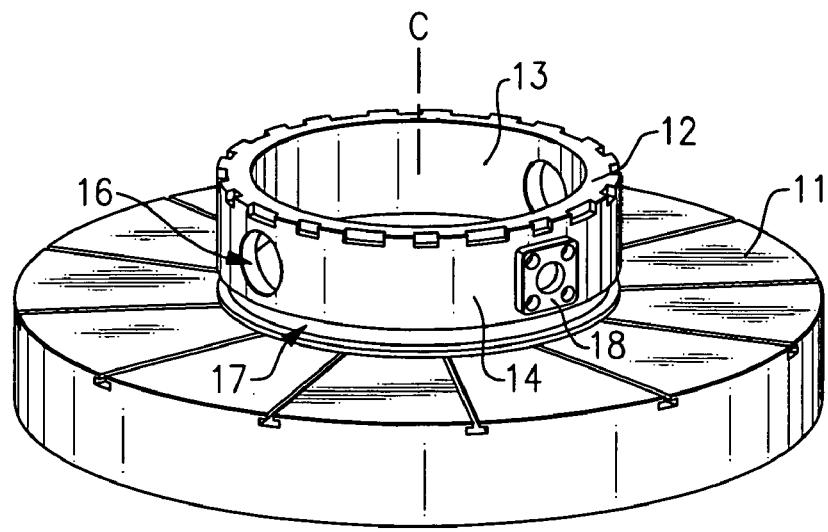
FIG. 1 is a schematic perspective illustration of a workpiece mounted on a positioning rotary table.

Referring now to FIG. 1, a positioning rotary table is shown at 11 as part of a lathe system with a live spindle (not shown). The workpiece to be machined is shown at 12.

In operation, the positioning rotary table 11 is selectively rotated about its c-axis while the live spindle moves the cutting tool to a desired position for machining a particular portion of the workpiece 12. The machining may occur on the inner diameter 13 of the workpiece 12, the outer diameter 14, or points therebetween such as the hole 16 or slot 17. A boss 18 is mounted on the outer diameter 14 and, for purposes of this discussion, will be considered to have been machined by the present lathe machine, with the next step being required, i.e. the on-machine measurement of certain features by way of a touch probe.

In order to facilitate the on-machine measurement of a component with a touch probe, it is necessary to first of all, ensure that the position capability of the machine is accurate and dependable. Secondly, it is necessary to calibrate the probe apparatus for the particular machining process involved. Let us first discuss the machine calibration process.

Figure 2:
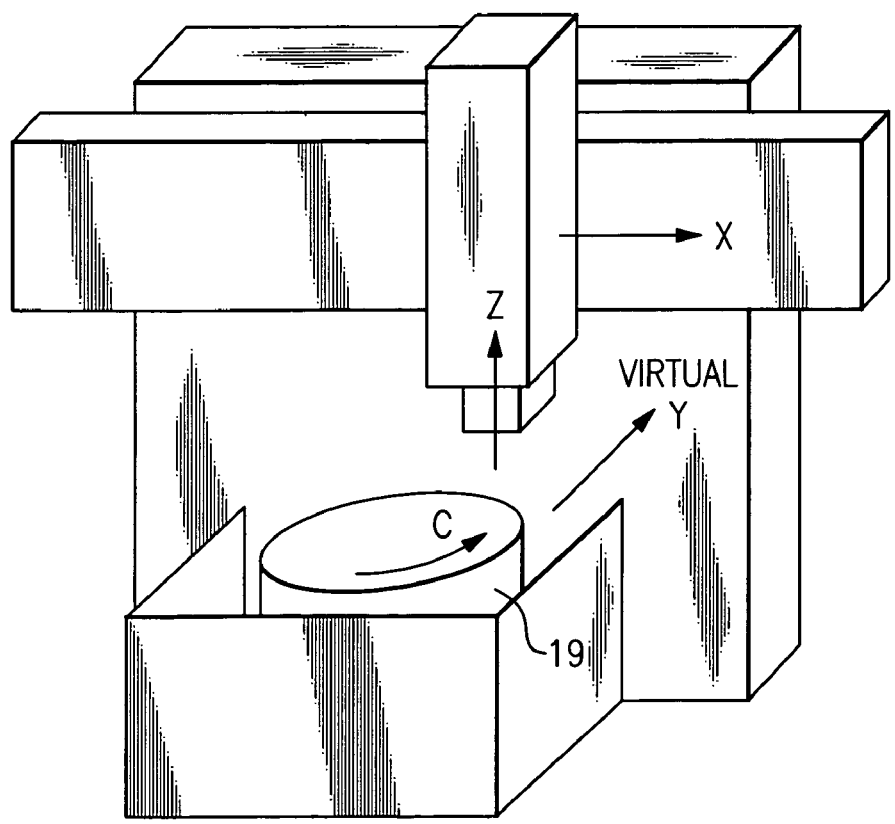
FIG. 2 is a schematic perspective illustration of a lathe with a positioning rotary table. The y-axis may be called a virtual axis because there is no programmable motion in that direction.

Referring to FIG. 2 there is schematically shown a lathe system with a live spindle and positioning table within the various dimensions involved. Here the work holding spindle 19 is provided to hold and turn the workpiece while the two linear axes x and z position the cutting tool in a two dimensional plane. This is also the case with a standard lathe system. However, in the present case, (i.e. with a live spindle and positioning table), calibration is now also required in the virtual y-axis as shown. The errors that may occur in the virtual y-axis of a lathe with a positioning rotary table include the following ten errors:

C—axis rotational accuracy
C—axis angular positioning repeatability
C—axis cyclic error
X—axis straightness in Y direction
Z—axis straightness in Y direction
Z—axis roll
Z—axis pitch
X—axis roll
X—axis yaw
Z—C parallelism in Y direction.

As part of the invention described, these ten error parameters are measured according to ASME B5.54 Standard, "Methods for performance evaluation of computer numerically controlled machining centers", 1992. The errors are added according to ISO Guide.

As a guide to the expression of uncertainty in measurement, ISBN 1993; 92-67-10188-9 is applied to estimate the overall measurement accuracy. This is then maintained at or below a predetermined level such as, for example, 25%, of the tolerances of workpiece features to be measured. Example calculations are shown in Table 1 below:

TABLE 1

| Error parameter | measured error | Std. Dev. of error |
| --- | --- | --- |
| P1 | E1 | E1/sqrt(3) |
| P2 | E2 | E2/sqrt(3) |
| P3 | E3 | E3/sqrt(3) |
| P10 | E10 | E10/sqrt(3) |
| Combined Std. Dev. of error | | sqrt(E1$^2$/3 + E2$^2$/3 + E3$^2$/3 . . . + E10$^2$/3) |
| Expanded Error for 95% (k = 2) | | 4 * sqrt(E1$^2$/3 + E2$^2$/3 + E3$^2$/3 . . . + E10$^2$/3) |
| Tolerance | | T |
| Accuracy estimate as percent of T | | 100 * 4 * sqrt(E1$^2$/3 + E2$^2$/3 + E3$^2$/3 . . . + E10$^2$/3)/T |

In addition to the calibration of the machine itself, it is necessary to calibrate the touch probe that is used in the measurements of features that are machined on the workpiece. In this regard, there are two errors that will inherently occur in measurements made with the use of a touch probe. First, as the touch probe is moved into contact with a surface of the workpiece and the signal is sent to the controller for recording the axis position, the touching of the part and the recording of axis position are not simultaneous. First of all, after initial contact, an additional movement is necessary before the required force develops between the probe and contacted surface for the sensor to recognize contact. All mechanical elements involved deflect due to this force. Secondly, time elapses while the signal is sent during which the machine axis continues to move prior to the controller recording the position and sending the command for the axis to stop. The difference between actual position when first contacted occurs on the measured position of contact is the probe pretravel. This value must be established during probe calibration.

The probe pretravel is direction dependent and speed dependent. In conventional probe calibration is it established by measuring something of known size (calibration artifact) in both directions at a fixed speed. All subsequent measurements are then done at the same speed and the pretravel established during calibration is added to all measured dimensions.

In addition to probe pretravel error as discussed hereinabove, for the probe calibration using a rotary table, there is an added complication caused by the "radial effect". That is, measurement of a dimension by the actuation of a rotary, c, axis must incorporate some form of compensation for the radial effect. That is, a constant arc of rotation translates into variable length dimensions, dependent on the radius from the center of the arc (center of c-axis rotary table) and the curvature of the feature to be measured. Three different approaches to obtain this compensation factor will now be described.

The first method of compensation is to calibrate the probe on a feature having the following properties in common with the features to be measured on the workpiece:

a: radius of curvature at the contact points (i.e. where the probe contacts the piece)
b: radial position relative to the c-axis centerline.

Figure 3:
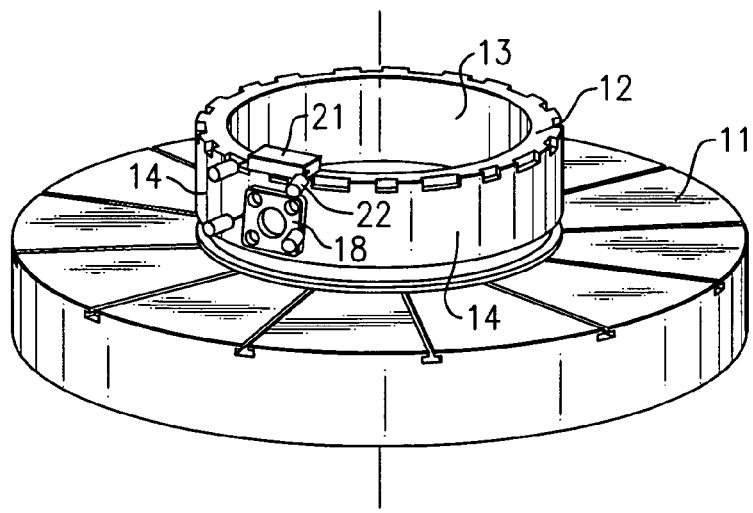
FIG. 3 is a perspective view of a workpiece and an artifact used in calibrating a probe in accordance with one aspect of the invention.

In FIG. 3 there is shown a positioning rotary table 11 with a workpiece 12 attached thereto and with a boss 18 mounted on the outer diameter 14 of the workpiece 12. It is the width of the boss 18 which is to be machined to a specified dimension and then measured by use of the touch probe to ensure that it is within the prescribed tolerance for the particular dimension.

A calibration artifact 21 is attached to the workpiece 12 as shown. The artifact 21 is precisely located so as to be in the same radial location (i.e. radial distance from the c-axis) and having a width, as determined by separate and precise means, equal to the desired width of the boss 18.

First, the touch probe 22 is used to contact the surfaces on either side of the artifact 21 as shown, with corresponding electronic signals being passed to the processor to record the respective positions of the probe. Taking the difference between these two recorded positions will then provide the nominal (i.e. with the above described errors included) width of the calibration artifact 21. Knowing the actual width of the artifact 21, the sum of the errors can then be calculated by the difference between the nominal size and actual size. That is, the probe pretravel is included in this difference.

The next step is to use the touch probe 22 to contact the two side surfaces of the boss 18 as shown (while maintaining the same radial position of the probe 22 as when measuring the width of the artifact 21). The result is a nominal measurement of the width of the boss 18. The actual measurement can then be determined by applying the sum of the errors as obtained by use of the artifact 21.

The above described method of probe calibration is relatively easy to implement but requires the creation of an artifact with representative geometry to be created for each feature that is intended to be measured.

Figure 4:
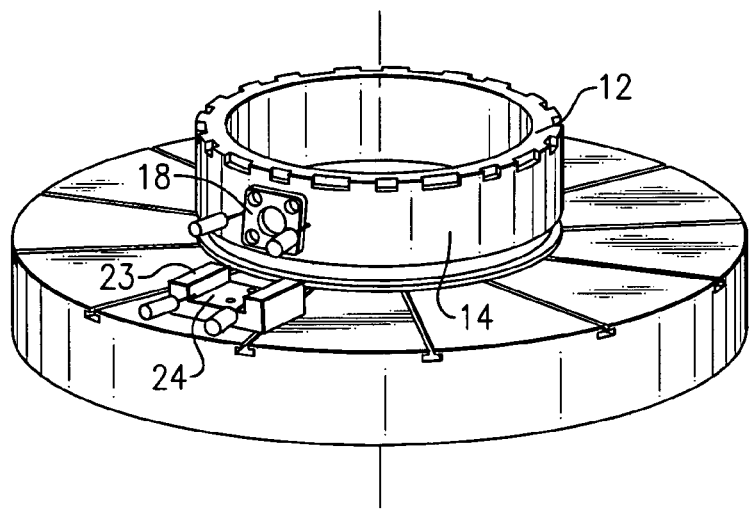
FIG. 4 is a perspective view of a workpiece and an artifact as used for purposes of calibrating a probe in accordance with another aspect of the invention.

The second method of error compensation as shown in FIG. 4 uses a calibrated artifact 23 that is comprised of a slot 24 (or hole, depending on what is intended to be measured) having a known width and center distance from the center of the rotary, C, axis. In this scenario, the geometry and location of the calibration detail is similar, but not identical to the feature that we wish to inspect. The nominal width of the calibration slot 24 is measured using the C-axis rotation. The measurement of the slot width is compared to the actual width, as previously recorded. Next, the nominal width of the boss 18 is measured using the C-axis rotation, and compensation is made by applying the above determined measurement deviation. In order to obtain the actual width of the boss 18 it is necessary to further adjust the measured nominal width by taking into account that the artifact 23 is located at a different radial location than the boss 18. The primary reason for this further adjustment is that, because the radial location of the probes when contacting the artifact 23 is substantially greater then the radial location of the probes when contacting the boss, the angle in which the probe makes contact with the surfaces of the pieces will be different. However, having knowledge of the exact radial location in which the probe 22 contacts each of these pieces, appropriate adjustments can easily be calculated to obtain the actual width of the boss 18.

Figure 5:
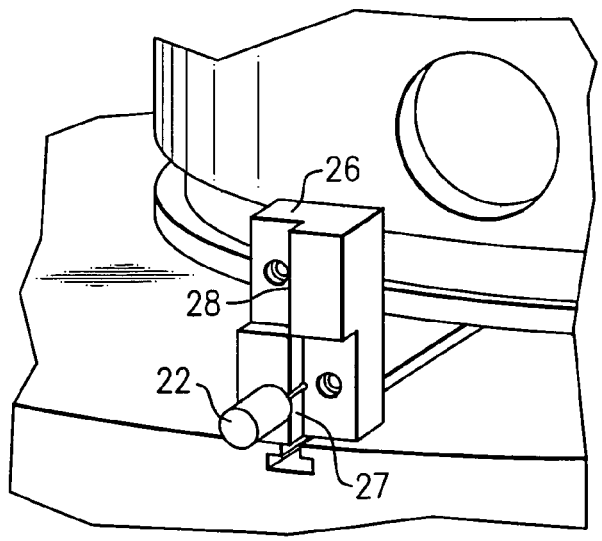
FIG. 5 is a perspective view of a probe calibration artifact as mounted on the rotary table in accordance with another aspect of the invention.

A third method of compensation uses a "zero degree" artifact shown at 26 in FIG. 5, which has two surfaces 27 and 28 located at the same angular location, with one surface being accessible from the positive direction and the other from the negative direction of table rotation. The touch probe 22 is first made to contact the surface 27, with a signal being sent back to the processor for recording. The probe is then made to contact the surface 28 and a signal is sent back to the processor for recording. The resulting "thickness" or difference between the two is the nominal "thickness", and the actual thickness is 0. The difference between the two is the measured error as determined by the artifact. However, the adjustments for the different radial locations of the artifact 26 and the boss must be calculated as described hereinabove. The final error adjustment can then be made to the nominal measurements made on the workpiece to obtain the actual width thereof.

While the present invention has been particularly shown and described with reference to a preferred mode as illustrated in the drawings, it will be understood by one skilled in the art that various changes in detail may be effected therein without departing from the scope of the invention as defined by the claims.

We claim:

1. A method of calibrating an electronic touch probe for the on-machine measurement of selected features of a workpiece in a lathe rotary table, which measures dimensions by the c-axis rotation of the table, comprising the steps of:
   locating the workpiece on the table at a first known radial position with respect to said c-axis, said workpiece having selected features of desired dimensions;
   locating an artifact having selected features with known dimensions, on the table at a second known radial position with respect to said c-axis;
   using the touch probe to contact the surfaces related to said artifact selected features, measuring the nominal dimensions thereof;
   comparing said nominal dimensions with said known dimensions to obtain a sum of errors;
   measuring said workpiece selected features to obtain the nominal dimensions thereof; and
   applying said sum of errors to said workpiece nominal dimensions to obtain the actual dimensions thereof.

2. A method as set forth in claim 1 wherein said first known radial position is equal to said second known radial position.

3. A method as set forth in claim 2 wherein said artifact known dimensions are substantially equal to said workpiece desired dimensions.

4. A method as set forth in claim 1 wherein said second known radial position is not equal to said first known radial position and including the further step of further adjusting the calculated actual dimension of the workpiece by a factor which is dependent on the difference between said first and second known radial positions.

5. A method as set forth in claim 4 wherein said artifact includes a slot with its selected features being opposing side walls of the slot.

6. A method as set forth in claim 4 wherein said artifact includes a pair of oppositely facing surfaces that are located at the same angular location with respect to said c-axis.

7. A method of determining the accuracy of a live spindle lathe machine with a positioning rotary table, such an apparatus being capable of operating in the x, y and z linear axes and in a rotary axis c, comprising the steps of:
   identifying the errors that can occur in the y direction;
   measuring the identified errors on the apparatus;
   adding the identified errors and calculating the estimated overall measurement accuracy; and
   comparing the total error with a predetermined threshold error level to determine whether the accuracy of the machine is acceptable.

8. A method as set forth in claim 7 wherein said identified errors are as follows:
   C—axis rotational accuracy
   C—axis angular positioning repeatability
   C—axis cyclic error
   X—axis straightness in Y direction
   Z—axis straightness in Y direction
   Z—axis roll
   Z—axis pitch
   X—axis roll
   X—axis yaw
   Z—C parallelism in Y direction.

9. A method as set forth in claim 8 wherein the estimated overall measurement accuracy is calculated as follows:

Accuracy estimate as percent of $T =$ $$100 \times 4 \times sqrt(E1^2/3 + E2^2/3 + E3^2/3 \ldots + E10^2/3)/T$$

wherein E1, E2 . . . E10 are the measured errors of the respective error parameter;

T=tolerance.

* * * * *